M. DRANE.
SIGNAL DEVICE FOR VEHICLES.
APPLICATION FILED OCT. 18, 1917.
1,279,093.
Patented Sept. 17, 1918.
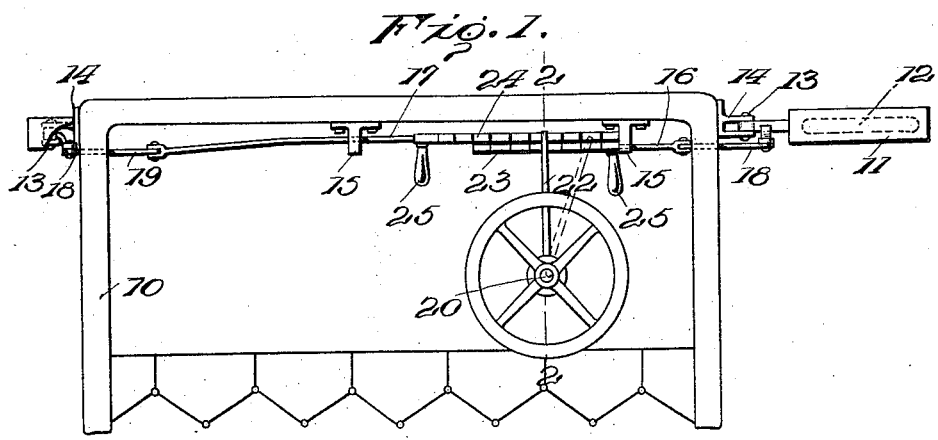
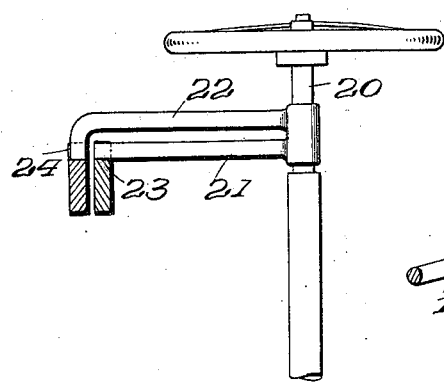
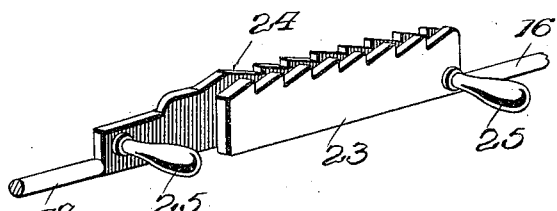
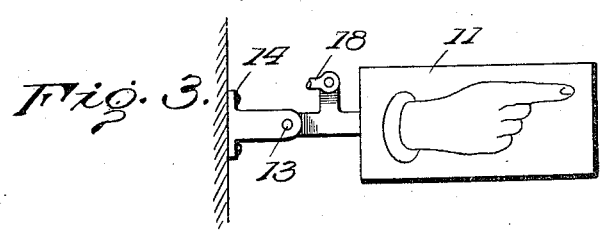
Inventor
Merritt Drane.
By Max A Schmidt
Attorney

UNITED STATES PATENT OFFICE.

MERRITT DRANE, OF LYNDON, KENTUCKY.

SIGNAL DEVICE FOR VEHICLES.

1,279,093.     Specification of Letters Patent.     Patented Sept. 17, 1918.

Original application filed December 23, 1916, Serial No. 138,606. Divided and this application filed October 18, 1917. Serial No. 197,256.

*To all whom it may concern:*

Be it known that I, MERRITT DRANE, a citizen of the United States, residing at Lyndon, in the county of Jefferson and State of Kentucky, have invented certain new and useful Improvements in Signal Devices for Vehicles, of which the following is a specification.

This invention relates to signal devices employed in connection with motor vehicles to indicate the fact that the driver is about to make a turn, and also the direction in which the turn is to be made, thereby giving notice of the intention of the driver of the car.

The present application is a division of the application filed December 23, 1916, Serial No. 138,606.

The invention has for its object to provide a novel and improved signal device of the kind stated which is efficient in operation and easily controlled, and by the use of which it is not necessary for the driver to extend one arm outward from the car when a turn or a stop is about to be made, as is the usual practice, the device being also operative after dark.

The object stated is attained by means of a combination and arrangement of parts to be hereinafter described and claimed, and in order that the same may be better understood, reference is had to the accompanying drawings forming a part of this specification.

In the drawings—

Figure 1 is a plan view of a fragment of an automobile, showing the application of the invention;

Fig. 2 is a cross-section on the line 2—2 of Fig. 1;

Fig. 3 is an elevation of an indicator, and

Fig. 4 is a detail in perspective.

Referring specifically to the drawings, 10 denotes a fragment of the front of the body of an automobile or other motor vehicle. On each side of the body is mounted a pivoted visual signal member or indicator 11 which is in the form of a casing inclosing an electric or other lamp 12 so that the signal may be observed after dark, and also having on its front and rear faces the representation of a hand. The indicator is pivoted at 13 to a suitable bracket 14 mounted on the side of the car body at the front end thereof, and it swings in a vertical plane. Normally, the indicator rests in upright position alongside the car body, and when the signal is to be given, it is swung down into horizontal position to extend straight outward from the car. As each side of the car is equipped with one of the indicators, the direction in which the car is to make a turn will be indicated by projecting the indicator on that side of the car toward which the turn is to be made.

The following means are provided for controlling the indicators:

In suitable guides 15 mounted on the front wall of the car body 10, inside the car, are two horizontally positioned slidable rods or bars 16 and 17, respectively. The rod 16 has connected to its outer end a link 18 which passes through an aperture in one of the side walls of the car body and is connected to the indicator 11 on that side of the car. The rod 17 is connected by a link 19 to the indicator 11 on the other side of the car. The connections between the rods and the indicators are such that when the rods are slid in one direction the indicators are swung into display position, and when the rods are slid in the opposite direction, they are swung upward into inoperative upright position alongside the car.

The rods 16 and 17 are operated manually, and also by means of a connection with the steering shaft 20 of the car. On this shaft are fixed two resilient fingers 21 and 22, respectively, which extend radially from the shaft. On the rod 16 is a rack 23 which is engaged by the spring finger 21, and the rod 17 has a rack 24 which is engaged by the spring finger 22. The racks are on the inner ends of the rods 16 and 17, and said ends of the rods lap and are parallel. The inner ends of the rods are also fitted with handles 25 within easy reach of the driver.

The teeth of the respective racks 23 and 24 are inclined in opposite directions, the arrangement being such that when the rod 16 is moved to the right, the finger 21 slips over its rack 23, whereas when the rod 17 is moved to the left, the finger 22 slips over its rack 24. The rod 16 is connected to the indicator 11 on the right hand side of the car, and the rod 17 is connected to the indicator 11 on the left hand side of the car. The two indicators are set in display position by sliding the proper rod. When this is done, assuming that the right hand indicator is to be set, the spring finger 21 trails over the rack 23, and when the steering wheel is turned the spring finger also slips over the rack. The spring finger 22 is also forced over the rack 24 and along the same. The movement of the rod 16 toward the right has swung the selected indicator 11 outward into display position, the rod 16 being moved manually by means of its handle 25. Now, when the steering wheel is turned back to the left to steer the car straight forward after the turn has been made, the spring finger 21 catches on the rack 23 and the rod 16 is drawn inward to swing the set indicator back to inoperative position. If the rod is moved farther than necessary to restore the indicator to normal position, no damage will result as the spring finger will be forced over the rack. The operation of the indicator on the other side of the car is the same as that just described.

While the preferred embodiment of the invention has been shown, it will be evident that various changes and modifications may be made without departure from the spirit and scope of the invention as claimed hereinafter.

I claim:

1. A direction signal for motor vehicles, comprising signal members pivotally mounted at the sides of the vehicle and adapted to be swung to project outward therefrom, longitudinally slidable members operatively connected to the signal members for actuating the same, racks on the slidable members, the teeth of said racks being inclined, respectively, in opposite directions, and resilient actuator members engageable with the respective racks.

2. A direction signal for motor vehicles, comprising in combination with a movable steering element of the vehicle, signal members pivotally mounted at the sides of the vehicle and adapted to be swung to project outward therefrom, longitudinally slidable members operatively connected to the signal members for actuating the same, and actuators carried by the aforesaid steering element and engageable with the slidable members for moving the same in a direction to withdraw the signal members from display position, said actuators being yieldable when the slidable members are moved in a direction to set the signal members in display position.

3. A direction signal for motor vehicles, comprising in combination with a movable steering element of the vehicle, signal members pivotally mounted at the sides of the vehicle and adapted to be swung to project outward therefrom, longitudinally slidable members operatively connected to the signal members for actuating the same, racks on the slidable members having their teeth inclined in opposite directions, and resilient actuator members carried by the aforesaid steering element and engageable with the respective racks, said actuators being yieldable when the slidable members are moved in a direction to set the signal members in display position.

In testimony whereof I affix my signature.

MERRITT DRANE.

Copies of this patent may be obtained for five cents each, by addressing the "Commissioner of Patents Washington, D. C."